United States Patent Office

3,836,627
Patented Sept. 17, 1974

3,836,627
PROCESS FOR MAKING MAGNESIUM OXIDE AND MAGNESIUM HYDROXIDE FROM CALCINED DOLOMITE AND MAGNESIUM CHLORIDE
Klaus Wiensz, Wulfrath, and Friedrich Bischoff, Hagen, Germany, assignors to Kali und Salz Aktiengesellschaft, Kassel, Germany
No Drawing. Filed Feb. 29, 1972, Ser. No. 230,527
Int. Cl. C04b 3/00; C01f 5/06, 5/14, 11/02
U.S. Cl. 423—169     4 Claims

ABSTRACT OF THE DISCLOSURE

Magnesium oxide or magnesium hydroxide are made by forming an intimate mixture of calcined dolomite and the stoichiometric amount of magnesium chloride (relative to the CaO contents of the dolomite), then dehydrating the mixture by heating it above 100° C., introducing the thus formed solid into water and recovering the magnesium oxide or -hydroxide residue by filtration.

BACKGROUND OF THE INVENTION

The invention relates to a process for making magnesium oxide or magnesium hydroxide from calcined dolomite and magnesium chloride.

Numerous processes are known which permit to make magnesium oxide from calcined dolomite and magnesium salts. Most of these processes start from solid crystallized magnesium chloride or final liquors as obtained in the potash recovery in which liquors magnesium chloride is present in an amount of 30%. The magnesium hydroxide usually is precipitated by adding lime or calcined dolomite to an aqueous solution, removing the magnesium hydroxide by filtration and calcining it to magnesium oxide.

The magnesium hydroxide in these processes is however obtained in a form which is difficult to filter. Several prior art processes proceed therefore at specific pH values to improve the filtration properties of the magnesium hydroxide or include preliminary precipitations. This however causes a substantial additional cost for the filtration of the magnesium hydroxide and for the drying of the precipitate which has a high water contents. Most of these processes therefore have not been accepted in industrial practice.

Another prior art process is to the effect that powdered crude dolomite is reacted with solid crystallized magnesium chloride at temperatures between 500 and 700° C. In order to obtain yields between 70 and 90% it has been suggested to employ 1.5 times the amount of magnesium chloride, related to the calcium carbonate contents, and to use magnesium chloride of a low water contents in order to avoid foaming when the mass is fused together. This process has the shortcoming that the yield relative to the total amount of the magnesium compounds is unsatisfactory or that comparatively high temperatures are required to improve the yield. It has also been found that the process is difficult to carry out because of the strong foaming of the mass.

It is therefore an object of the present invention to provide for a process for making magnesium oxide or magnesium hydroxide which has excellent filtering properties and to obtain this product at a virtually quantitative yield.

SUMMARY OF THE INVENTION

This object is solved by forming an intimate mixture of calcined dolomite and the stoichiometric amount of magnesium chloride, relative to the CaO contents of dolomite, dehydrating the mixture by heating it above 100° C., introducing the thus formed solid into water and recovering the magnesium oxide or -hydroxide residue from the water by filtration.

DETAILS OF THE INVENTION AND PREFERRED EMBODIMENTS

The mixture of calcined dolomite and magnesium chloride should be heated to temperatures between about 100 and 500° C. The preferred temperature range is between 250 and 450° C. The temperature itself however is not very critical. A higher temperature reduces the heating time and leads to a stronger inactivation of the magnesium hydroxide in respect of hydration when the solid mass is introduced into water. The filtration speed, as has been found, is not much affected thereby.

The calcined dolomite preferably is a soft burned dolomite with a sufficient magnesium oxide MgO contents. The soft burned mineral is preferred because of its higher reactivity. The mixture of solid magnesium chloride and calcined dolomite thus heats up after a comparatively short time and forms a spreadable paste. It is advisable to use a calcined dolomite of which the MgO contents is such to make it available at a desirable price relation regarding the starting products. The reason is that the amount of magnesium chloride must be equivalent to the CaO contents in the dolomite in order to obtain a magnesium oxide which is low in CaO contents.

The magnesium chloride may be the usual commercial crystallized magnesium chloride ($MgCl_2 \cdot 6H_2O$). It is however possible also to employ high percentage final liquors arising in the potash production. This, however, has the disadvantage that the heating time for the mixture with the calcined dolomite is longer since more water must be expelled before hardening occurs. It is therefore generally advisable, if only these liquors are available for the raw material, first to effect a separate concentration by evaporation of the liquor.

It is of course also possible to use other magnesium salts instead of magnesium chloride for the process of the invention provided that the anion does not form calcium salts of low solubility.

The process of the invention is carried out by forming an intimate mixture of the ground starting materials in a suitable mixing apparatus. The mixing can of course also be combined with the grinding of the starting materials. It is preferred to carry out the mixing of the ground starting materials in a mixing screw which is heated indirectly or directly in order to simultaneously dehydrate the formed paste and cause its granulation.

The granulate is then introduced into water which will heat up because of the hydration of the dehydrated calcium chloride. If the preceding dehydration of the mixture is carried out as a discontinuous step a solid cake will be obtained which before its introduction into water should be crushed and ground in order to expedite the extraction of the calcium chloride.

The necessary amount of water is used in the conventional range and is not critical for the filtering properties of the magnesium oxide or -hydroxide. More specific figures for the amount of water will be found in the following examples.

In order to remove the calcium chloride as far as possible from the filter residue a washing or several washing steps are advisable.

The calcium chloride liquor obtained as filtrate can be further processed by adding calcined dolomite and introduction of $CO_2$ so as to obtain magnesium chloride.

The filter cake will consist of magnesium oxide and/or magnesium hydroxide depending on the heating temperature employed. Comparatively low amounts of mechanically bound water are in the filter cake. To further process the product so as to form a sinter magnesite it is advisable to calcine the product at temperatures between 800 and 1100° C. and then to pelletize it in the usual form followed by sintering. This permits to obtain a sinter magnesite of nearly theoretic density. If the filtration residue is immediately pelletized or briquetted and sintered a useful magnesite sinter can also be obtained which however has a higher degree of porosity.

The following examples will further illustrate the invention. As will appear the filtration speed is substantially increased by the process of the invention as compared with conventional processes.

EXAMPLES

For the following Examples 1 to 5 a caustically calcined dolomite was used which had been obtained by 2½ hour calcination of crude dolomite powder in an electrically heated muffle oven at a temperature of 1,000° C. The dolomite then showed the following analysis:

| | Percent |
|---|---|
| Calcination loss | 1.23 |
| $SiO_2$ | 0.69 |
| $Fe_2O_3$ | 0.70 |
| $Al_2O_3$ | 0.40 |
| $Mn_3O_4$ | 0.13 |
| CaO | 60.85 |
| MgO | 36.29 |

As magnesium chloride a chemically pure commercial product was used ($MgCl_2 \cdot 6H_2O$).

The calcined dolomite was reacted with an amount of magnesium chloride equivalent to the CaO contents and was intimately triturated with the magnesium chloride. This resulted in heating up of the mixture and obtaining of a pasty consistency. 221 g. magnesium chloride were used for 100 g. of calcined dolomite. The mixing of the starting materials was effected in a mixing mill. The formed slurry was the starting material employed in Examples 1 to 5.

This paste was heated in Examples 1 to 3 in amounts of about 100 g., each, to temperatures of 110, 200 and 300° C. The heating period in all cases was 18 hours. The paste was thus dehydrated and hardened. Depending on the heating temperature the following weight loss was observed:

| Heating temperature: | Weight loss, percent |
|---|---|
| 110° C. | 12.1 |
| 200° C. | 24.4 |
| 300° C. | 25.4 |

Because of the contents of dehydrated calcium chloride the specimens obtained were hygroscopic.

About 50 g. of the heated and hardened specimens were reacted without crushing them with 500 cm.³ water and were boiled for 15 minutes while stirring. The residue was removed by suction by means of a Büchner funnel (15 cm. diameter, tin strip filter) and was washed with about 400 ml. hot water. The filter cake was then again stirred into 400 ml. water removed by suction and washed until free of chlorine. The amount of water was about 200 and 300 ml. The residue was then dried at 105° C. for 18 hours.

In Examples 4 and 5 the paste was heated in an electric muffle oven to 450° C. for a period which likewise was 18 hours. The hardened specimens were then crushed in a mortar and lixiviated with cold water. The product was then washed cold and not slapped to remove water. Otherwise the operation was the same as in Examples 1 to 3.

The filtration of the precipitates in a vacuum of 22 mm. Hg required 1½ minutes.

The following Table 1 shows the analysis of the precipitates which were dried at 105° C.:

TABLE 1

| Example number | 1 | 2 | 3 | 4 | 5 |
|---|---|---|---|---|---|
| Temperature, °C | 110 | 200 | 300 | 450 | 450 |
| Calcination loss at 1,000° C | 31.18 | 31.22 | 31.24 | 30.33 | 31.46 |
| $SiO_2$ | 0.75 | 0.70 | 0.70 | 0.64 | 0.65 |
| $Fe_2O_3$ | 0.60 | 0.58 | 0.56 | 0.62 | 0.58 |
| $Al_2O_3$ | 0.21 | 0.27 | 0.44 | 0.19 | 0.34 |
| MnO | 0.14 | 0.11 | | 0.12 | |
| CaO | 1.55 | 1.68 | 1.55 | 0.98 | 0.98 |
| MgO | 65.42 | 65.32 | 65.62 | 67.12 | 66.02 |
| Cl | 0.16 | 0.19 | 0.24 | 0.16 | 0.18 |

The following Table 2 shows the actual analysis while in Table 3 the chemical composition of the products without calcination loss is listed. The then following Table 4 shows the yield obtained in the individual tests when taking into consideration the analysis of the filtrates.

TABLE 2

| Example number | 1 | 2 | 3 | 4 | 5 |
|---|---|---|---|---|---|
| Temperature, °C | 110 | 200 | 300 | 450 | 450 |
| Percent: | | | | | |
| $SiO_2 + R_2O_3$ | 1.7 | 1.7 | 1.6 | 1.6 | 1.6 |
| $Mg(OH)_2$ | 94.7 | 94.5 | 95.0 | 97.1 | 95.5 |
| $CaCl_2$ | 0.3 | 0.3 | 0.4 | 0.3 | 0.3 |
| CaO on $CO_2$ or $H_2O$ [1] | 1.4 | 1.5 | 1.4 | 0.9 | 0.8 |

[1] Combined in molecular form.

TABLE 3

| Example number | 1 | 2 | 3 | 4 | 5 |
|---|---|---|---|---|---|
| Percent: | | | | | |
| $SiO_2$ | 1.09 | 1.02 | 1.02 | 0.92 | 0.95 |
| $Fe_2O_3$ | 0.87 | 0.84 | 0.81 | 0.89 | 0.85 |
| $Al_2O_3$ | 0.31 | 0.39 | 0.64 | 0.27 | 0.50 |
| $Mn_3O_4$ | 0.22 | 0.17 | | 0.18 | |
| CaO | 2.25 | 2.44 | 2.25 | 1.41 | 1.43 |
| MgO | 95.12 | 95.02 | 95.39 | 96.34 | 96.32 |

TABLE 4

| Example number | 1 | 2 | 3 | 4 | 5 |
|---|---|---|---|---|---|
| Amount of hardened product | 47.17 | 54.91 | 55.52 | 19.37 | 57.00 |
| In precipitate percent MgO | 98.3 | 97.8 | 98.2 | 98.3 | 97.4 |
| In precipitate percent CaO | 1.6 | 1.7 | 1.6 | 1.0 | 1.0 |
| Percent MgO in filtrate | 0.15 | 0.05 | | | |
| Percent CaO in filtrate | 98.3 | 97.5 | 98.0 | 97.8 | 97.7 |

EXAMPLES 6 AND 7

These examples illustrate the making of a sinter magnesite from the magnesium hydroxide which had been dried at 105° C. Cylinders of a diameter of 36 mm. were pressed for this purpose at a pressure of 1.2 t./cm.² (Example 6). Shaped bodies of the same dimensions and formed at the same pressure were also made from specimens which had been caustically calcined at 1,000° C. (Examples 7). The shaped bodies were then sintered at a temperature of 1550° C. After calcination they had the following properties:

| Example number | 6 | 7 |
|---|---|---|
| Density: hydrostatically (without open pores) | 3.51 | 3.51 |
| Bulk density | 3.10 | 3.50 |
| Open pores, percent by volume | 11.7 | 0.2 |
| Total porosity, percent by volume | 12.4 | 1.1 |

The following examples illustrate comparative tests of the filtering properties of magnesium containing precipitates.

EXAMPLE 8

Following the teachings of the present invention 20.6 g. of caustically calcined dolomite were triturated with 45.9 g. magnesium chloride. The paste was then heated to 450° C. and the hardened product was crushed in a mortar. The product was then subjected to lixiviation in 170 cm.³ of cold water while stirring and was permitted to stand for 2 hours. The required time for removing the material by means of a 15 cm. tin strip and a Büchner was 1 minute. The time required for the washing with 500 ml. of cold water was 5 minutes.

EXAMPLE 9

50 g. of crude dolomite dust were dissolved in 150 cm.$^3$ nitric acid (d.=1.23) and the solution was reacted with 20 ml. of a 25% concentration aqueous ammonia. 19 g. of caustically calcined dolomite were then introduced into the solution and the mixture was permitted to stand for 1½ hour. The time required for removing the filtrate by suction under the same conditions as in Example 8 was 11 minutes, the time for the water wash was 28 minutes.

EXAMPLE 10

86.5 g. of crystallized magnesium chloride were dissolved in 100 cm.$^3$ of water and reacted with 220 cm.$^3$ of a 4n.-NaOH solution. Filtration was effected after 1 hour. The time required for the removal by suction was 17 minutes. The required time for the washing 180 minutes.

The comparison furnished in Examples 8, 9 and 10 shows that the time requirement for the filtration of the magnesium containing residue or precipitate according to the invention has a ratio of about 1:11:17 to the prior art processes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A process for the production of magnesium oxide or magnesium hydroxide which comprises intimately mixing together particulate calcined dolomite which consists essentially of a mixture of magnesium oxide and calcium oxide with magnesium chloride in an amount that is at least stoichiometrically equivalent to the calcium oxide content of the calcined dolomite, heating the mixture at a temperature between 100 and 500° C. for a period sufficient to convert the calcium oxide in the calcined dolomite to water-soluble calcium chloride, and subsequently separating the water-soluble calcium chloride from the magnesium oxide or magnesium hydroxide by leaching the mixture with water and recovering the magnesium oxide or magnesium hydroxide therein.

2. A process as defined in claim 1 in which the mixing together of the particles of calcined dolomite and magnesium chloride is effected in a grinding operation.

3. A process as defined in claim 1 in which the heating of the mixture is effected at a temperature between 250 and 450° C.

4. A process as defined in claim 1 in which the magnesium salt is magnesium chloride hexahydrate.

References Cited

UNITED STATES PATENTS

| | | | |
|---|---|---|---|
| 1,661,043 | 2/1928 | Koehler | 423—163 |
| 2,206,131 | 7/1940 | Seil | 106—58 |
| 2,348,847 | 5/1944 | Pike | 423—164 |

OSCAR R. VERTIZ, Primary Examiner

B. E. HEARN, Assistant Examiner

U.S. Cl. X.R.

423—158, 164, 636, 639